June 12, 1923.

J. GOOD

INTERNAL COMBUSTION ENGINE

Original Filed Aug. 15, 1914    3 Sheets-Sheet 1

1,458,481

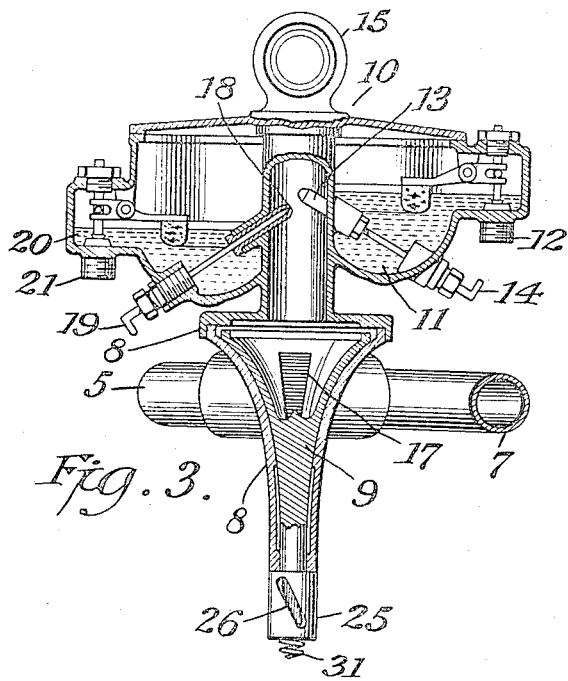
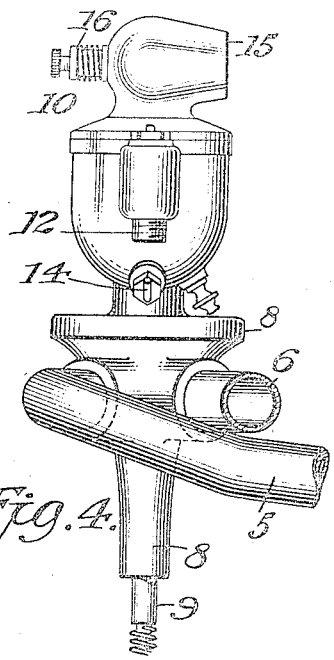
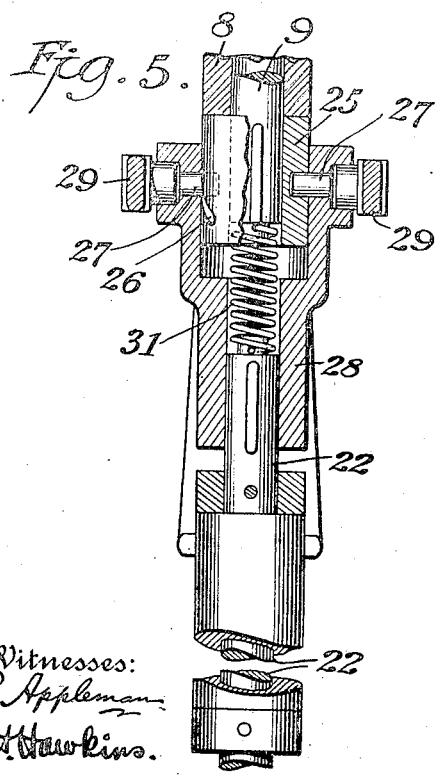
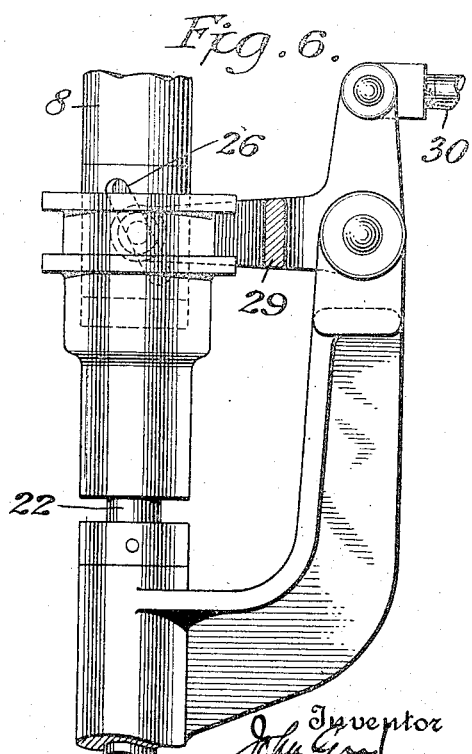

June 12, 1923.
J. GOOD
INTERNAL COMBUSTION ENGINE
Original Filed Aug. 15, 1914  3 Sheets-Sheet 3
1,458,481
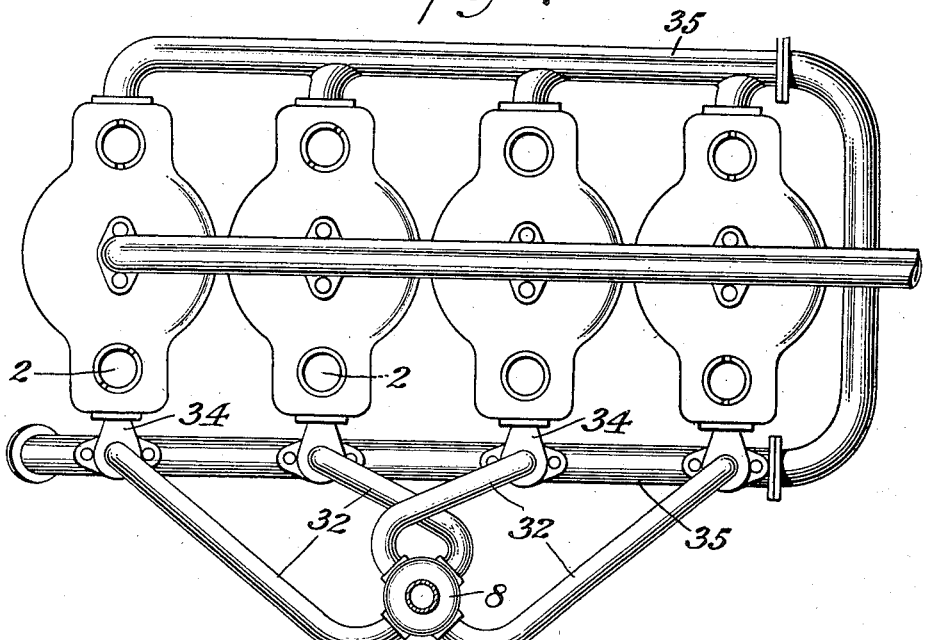
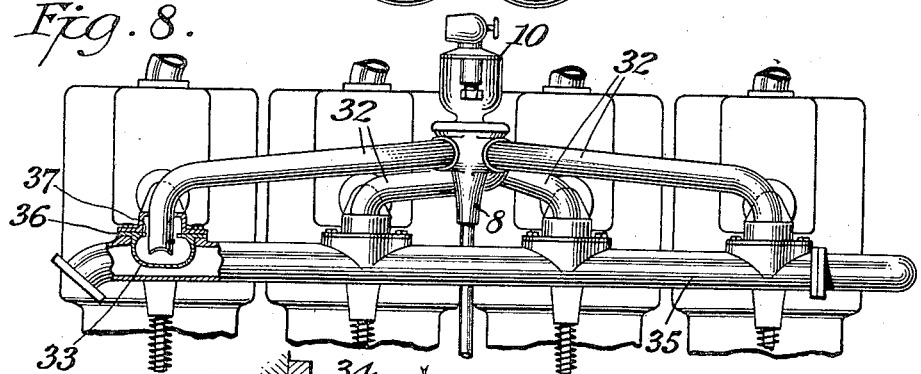
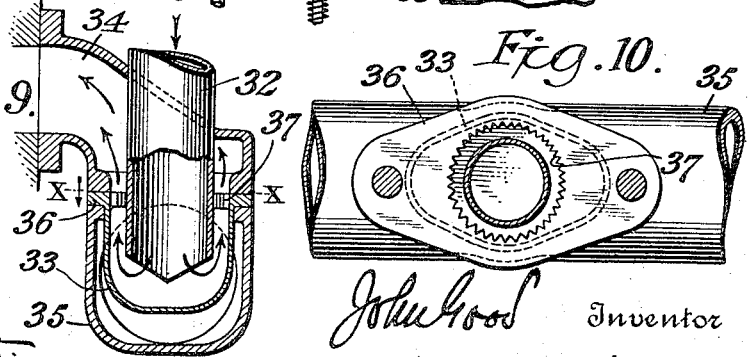

Patented June 12, 1923.

1,458,481

UNITED STATES PATENT OFFICE.

JOHN GOOD, OF GARDEN CITY, NEW YORK.

INTERNAL-COMBUSTION ENGINE.

Application filed August 15, 1914, Serial No. 856,906. Renewed July 2, 1921. Serial No. 482,193.

*To all whom it may concern:*

Be it known that I, JOHN GOOD, a citizen of the United States, residing in Garden City, Long Island, State of New York, have invented the following described Improvements in Internal-Combustion Engines.

The invention concerns the manner of introducing, distributing and controlling the carburetted fuel mixture supplied to internal combustion engines, and among its several objects includes the provision of means whereby the cylinders of multi-cylinder engines may receive their respective combustible charges from a single carburettor or vaporizer under identical conditions for each cylinder, and under conditions which cause distribution of unsuspended liquid in the charge mixture with exact equality to every cylinder, and whereby the amount of such charge supplied may be controlled to regulate the operation of the engine, and whereby the aspiration of the liquid fuel for one or all of the cylinders may take place under constant conditions of pressure and velocity at low as well as at high engine speed, and also whereby certain other incidental and important features of improvement are attained, all as will be hereinafter made apparent to those familiar with this subject.

Figure 1:
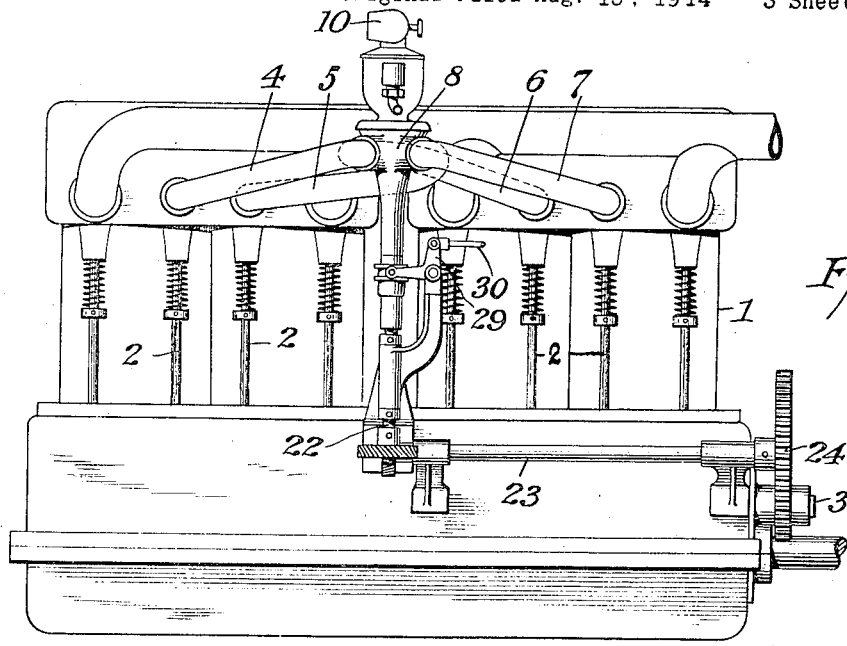
Figure 2:
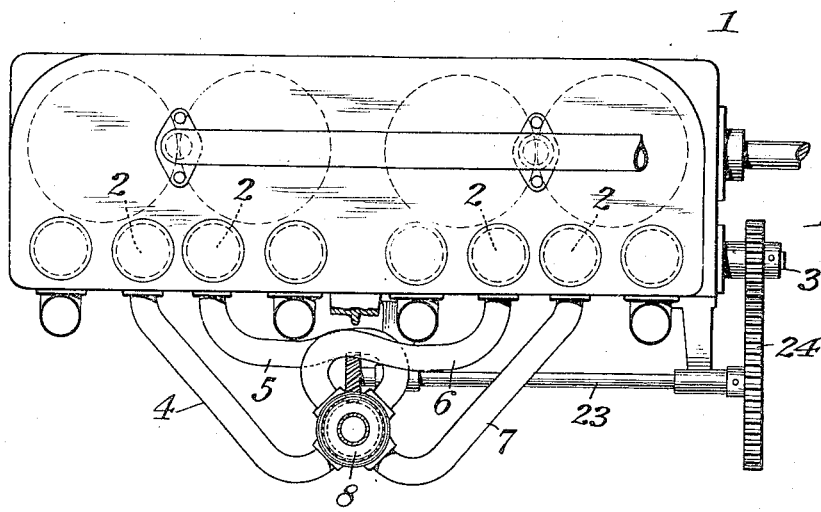

In the accompanying drawings,

Fig. 1 represents an internal combustion engine having the invention applied thereto in its preferred form;

Fig. 2 a top plan of Fig. 1;

Fig. 3 a central vertical section through the carburettor, with parts in elevation;

Fig. 4 a side elevation of the carburettor;

Fig. 5 a longitudinal section of the driving means for the distributor valve;

Fig. 6 a side elevation of the same means;

Figs. 7 and 8 are respectively top plan and side elevation of a development of the invention;

Fig. 9 a sectional detail of one of the vaporizing cups of said developed form; and Fig. 10 a cross-section on line X—X of Fig. 9.

The multi-cylinder engine illustrated at 1 in Figs. 1 and 2 may be assumed to be of an ordinary type of L-head construction, having an intake port and valve 2 for each of its several cylinders which are arranged in a straight line. The valves are operated by the cam-shaft 3, enclosed within the crank-case, and the intake ports are respectively connected by individual intake pipes 4, 5, 6 and 7 with the valve casing 8 of a primary or main distributing valve 9, and through the latter with a carburettor 10, which latter may be assumed to be an ordinary spray carburettor deriving its liquid fuel from a float chamber 11 (Figs. 3 and 4), in which the liquid level is kept constant by means of a float, as indicated. The liquid enters the float chamber by a pipe connection 12, and is drawn therefrom as a fine spray through the needle-valve nozzle 13 by the inspirative action of the engine. The usual needle-valve 14 controls the quantity of the liquid so supplied. Air enters the carburettor through the air intake bonnet 15, which may or may not be supplied with the usual air-valve, designated by 16 in Fig. 4. The carburettor is desirably applied to the top of the valve casing 8, as indicated, so that the air passing over the fuel nozzle may enter directly into the interior of that valve. The valve casing is formed of two parts bolted or screwed together, and one of such parts may conveniently be formed as a part of the carburettor mechanism, as illustrated in Fig. 3. The movable valve member 9 within the casing is adapted to be rotated by the engine, as presently described, but the particular nature of such valve is not of consequence to the present invention, and other types than that shown could be used with like effect.

In the present case, the said valve member is a hollow taper-curved shell open at the top and having a port 17 formed in its lateral curved wall. This port is adapted to register successively, as it rotates, with each of the ports in the curved seating wall of the casing 8 which lead to the several intake pipes 4, 5, 6 and 7, and so as to form successively a free and open passageway from the carburettor to the intake valve 2 of each engine cylinder for the combustion air and vaporized and suspended liquid fuel therein and through which the unsuspended liquid fuel may drain into the individual intakes in equal quantities. The interior of the hollow valve member therefore constitutes a distributing chamber supplying mixtures of equal proportions to the different intakes. Said valve member is held to its seat by means of a spring 31 secured between the end of its stem and the end of the shaft 22 which drives it. The intake pipes are so connected with the valve casing 8 that the rotation of the valve member will connect each of them with the carburettor in a proper sequence to coincide with the suction strokes of their respective cylinders, and the timing of the parts is such that the primary or common distributing valve 9 may hold each manifold port open for a period substantially equal to, though not necessarily coinciding with, the open period of the intake valves 2. These latter open as usual at about the beginning of each suction stroke and close at the end thereof or the beginning of the compression stroke. Each cylinder thus receives its mixture of air and fuel direct from the dis-tributing chamber of the carburettor and through its own intake pipe, and thereby each cylinder receives exactly the same character of combustible charge as its neighbor, a result which I have found cannot be realized in constructions where the charges for all the cylinders pass through a common manifold, as in the case, for instance, of the ordinary multi-cylinder automobile engine. In such constructions the liquid particles initially suspended in the mixture tend to separate from the air, hugging one side or the other of the manifold as a liquid stream and so as to become pocketed in passages leading to other cylinders not then making their suction strokes, with the result that some cylinders invariably get more fuel than the others and the combustion in the several cylinders is hence unequal. The provision of the individual intake pipes with a common primary distributing chamber which is preferably, though not necessarily, constituted by a valve chamber as above described, tends to eliminate this objection by distributing unsuspended liquid fuel equally to each cylinder and thus makes it possible to adjust the carburetor to the maximum efficiency for all the cylinders rather than to a compromise between them. At the same time a single carburettor device suffices for all. The several intake pipes 4, 5, 6 and 7 by preference run upwardly from their intake valves toward the primary valve, and the interior of the latter and of the pipe passages is formed without pockets or corners of any kind so that accumulated liquid will tend to drain off to the cylinders. These combined features of separate intake pipes and absence of interior liquid-retaining pockets insure that all unsuspended liquid emanating from the carburetor will flow equally to each cylinder, which is a result of much importance as I have ascertained, and not present in other engines having individual intake pipes so far as I am aware. The advantage thereof becomes apparent when the mixture supply is varied to change the engine speed and is represented by a prompt and smooth acceleration or pick-up on an increased supply of the charge mixture and vice versa on a decreased supply, the same being the direct result of the formation of the several flow passages with reference to the facility of liquid flow therein instead of merely gaseous flow.

When the engine is adapted to use kerosene and certain analogous liquid fuels, it is sometimes desired to introduce water with the fuel mixture at the higher engine loads, and for this purpose I have illustrated the carburettor 10 in the present case as supplied with a water nozzle 18 projecting into the main air passage through the carburettor at about the same point as the fuel nozzle 13. This nozzle is controlled by a needle-valve 19 the same as the valve 14 above described, and takes its water supply from a float-chamber 20 and supply connection 21, but the level of the water therein is maintained by the float somewhat lower than the level of the liquid-fuel chamber. The level of the water in the float-chamber 20, which is of course adjustable, determines the point in the range of the engine load at which the introduction of water begins to take place, and the needle-valve 19, which is also adjustable, controls the amount introduced. In the case of both nozzles 13 and 18, I have ascertained that they may point upwardly against the direction of the air without interfering with the aspirative action, and have utilized this fact by the arrangement illustrated in Fig. 3 of the drawings, to promote the compactness of the apparatus as a whole and avoid the use of bends in the air passage so far as possible.

The primary distributing valve 9 when used may be permanently set or adjusted so that its open periods will coincide exactly with the open period of each of the cylinder intake valves 2 and to produce only the results above indicated; but, by changing or varying such setting or adjustment, certain further advantages are obtained which permit the said valve to serve effectually as a throttle for the engine in place of any other device for that purpose. To this end the said valve member is connected with its driving gearing by a timing connection whereby it can be advanced or retarded, relatively speaking, with reference to the open period of the intake valves. The valve is driven by an upright valve-shaft 22, spirally geared to a lay-shaft 23 connected by gearing 24 to the cam-shaft 3 or otherwise, and the means constituting the said timing connection are constructed, in the present case, as follows. The stem at the tapered end of the valve 9 where it projects beyond the lower end of the valve casing 8 is keyed fast to a collar 25 which is formed with two opposite inclined or helical slots 26. These slots are engaged by a pair of pins 27 carried on the sleeve 28, which is in turn splined to the end of the driving shaft 22 so as to be capable of movement longitudinally of the said shaft, and a fork 29 is provided for causing such movement while the parts are in rotation. The forked lever 29 is connected with a control rod 30, and by the operation of the latter it will be evident that the relationship of the angular position of the valve 9 to that of its driving shaft 22 can be changed as desired, and by the operation of the said rod 30 the opening of the ports in the casing 8 may be caused to lag more or less behind the beginning of the suction stroke of the respective cylinders (and also the opening of their several intake valves 2), with the result that more or less rarefaction is established in each intake pipe until the primary valve 9 opens its entrance port, whereupon the mixture of fuel and air, or fuel, air and water, as the case may be, moves toward the cylinders with somewhat higher velocity than would otherwise be the case. This feature of inter-relation between the intake and primary distributing valve is disclosed and claimed in my co-pending application Serial No. 856907, filed August 15, 1914. The flow velocity will be greater or less according as the lag of the primary valve is made greater or less, and the actual weight of fuel and air thus admitted will also be varied accordingly, inasmuch as the intake valves 2 will in any event close at the end of the suction stroke. As a consequence, the operation of the engine may be wholly controlled by the mere regulation of the position of the rod 30, which takes the place of the throttle rod and the valve 9 thus becomes the main regulating member of the engine. The throttle (valve 9), it will be observed is symmetrically placed and operates symmetrically with respect to the entrances to all of the intake pipes leading from the carburetor distributing point; it does not interfere therefor with the equal distribution of fuel in liquid form to these intake pipes, but all are served alike.

It will be evident from the foregoing that the specific construction of the apparatus is not of the essence of the invention, and that various equivalent means can be employed for separately directing the fuel mixture and especially the unsuspended liquid from a single carburettor to various engine cylinders, and that various other changes and modifications in the size, proportion and arrangement of parts can be resorted to within the spirit and principles of the invention as set forth in the claims.

It will now be observed that the underlying principle of my invention is quite different from that of the prior practices. Whereas heretofore to secure equal distribution of the fuel efforts have been directed toward securing complete vaporization of the fuel prior to its introduction into the different manifold branches, the principle of my invention is to distribute the fuel to the manifold branches while the fuel or an appreciable part of it is still in liquid form. That is to say, the principle of my invention is to divide or allot liquid fuel to the different manifold branches rather than to divide or allot vapor; such a part of the fuel as may be vaporized prior to any branching of the manifold in my invention, follows the course of the accompanying mixture air and divides proportionally with it into the different branches. The disposition of the liquid fuel appearing in the individual intakes of my fuel system, and especially the disposition of the unsuspended liquid whether the same is delivered to the intakes in unsuspended form or falls out of the air while en route therein, is to some extent a matter of indifference except that it is intended that it shall be passed on to the cylinders, in a suitable form, substantially as fast as it accumulates. The engine may be adapted to handle the raw liquid in its cylinders, in which case the fuel system may drain directly into the cylinders (as before described) by gravity or the action of the flowing air on the liquid lying on the intake walls; and it is an obvious accompanying feature of my invention in such a case that the parts of the intake passages contained within the walls of the engine itself likewise have no traps where the liquid may accumulate indefinitely. Again the individual intakes may include atomizing or vaporizing devices (of the surface or other type, and heated or not as may be) so arranged that the deposited liquid is vaporized or that the air stream may pick up the raw liquid before it reaches the intake valves; for example, means may be placed in the individual intakes to entrap a limited quantity of the liquid for later delivery to an increased air flow to enrich the mixture during acceleration, or to form pools enabling the inflowing air to vaporize it with or without the assistance of heat, although as before pointed out, I prefer to form the intakes without pockets of any kind. An individual intake passage of my invention therefore (and as I use this term in this specification and claims), is an intake passage with or without accelerating or vaporizing traps which, by gravity or the air flow, passes on the unsuspended liquid delivered thereto or originating therein, as fast as the latter appears, either delivering it in unsuspended form directly to the individual intake part (or parts) of each cylinder in such a manner that unsuspended liquid may pass through into the cylinder, or analogously thereto delivering it through a single engine port to adjacent intake ports of two cylinders between which the liquid divides equally, or, on the other hand, vaporizes it or causes it to be again suspended in the air stream. Thus in the form of the invention illustrated in Figs. 7 to 10, the several features above described and the control are combined with a vaporizer or vaporizing baffle at the end of each undivided intake, utilizing exhaust heat for facilitating the evaporation of the liquid fuel prior to its entrance to the cylinders. The several individual intake pipes 32 are connected with the primary distributing casing 8 and carburettor 10 as before described, and each terminates at its opposite end in the interior of a cup 33, the exterior of which is subject to the heat of the exhaust gases of the engine. The mixture of fuel and air flowing through the pipe 32 enters the cup and, reversing its direction therein, passes to the engine cylinder through the connection 34. Any liquid particles impinging upon or collecting in the cup 33 are promptly vaporized. The exhaust gases are applied to the exterior of the several cups by means of a pipe 35, which envelopes each of them as indicated in the drawing, but any other means of conducting the exhaust gases to the exterior of the cups will be equally serviceable and the arrangement of the exhaust pipe will be necessarily made to conform with the design of engine on which the invention is used. The vaporizer cups 33 in the present case are let into the enlarged portions of the exhaust piping and held therein with their flanges 36 clamped between the exhaust pipe and the connection piece 34. The rim of the cup is provided with serrations 37 which operate to break up and divide solid masses of liquid that might otherwise pass to the cylinders, subdividing them into smaller particles which will be more readily ignited in the combustion space. Between each cup and the engine the branching of the mixture passage (and hence the number of cylinders that may be supplied by a single vaporizer and individual intake), is substantially a matter of indifference, since between the vaporizer and the intake ports substantially all the fuel exists in the form of vapor well mixed with the air, and hence follows along with the air and divides equally between any branches there may be.

I claim:

1. A multi-cylinder engine comprising engine cylinders, each having an intake valve and a separate intake pipe, a liquid fuel and air mixing device common to all of such intake pipes and means between such device and the intake pipes for successively connecting the device with the said pipes, the said device and pipes being inclined downwardly to drain toward the engine cylinders.

2. A multi-cylinder engine comprising engine cylinders each having an intake valve positively opened during the suction stroke, a device for mixing liquid fuel and air serving all of the cylinders, means for successively connecting such device with the several cylinders and means for changing the time period of said means with respect to the open period of the said intake valves.

3. In a multicylinder combustion engine, a carburetor, valve means intercepting the flow therefrom and adapted for manual adjustment to regulate the engine, separate intake pipes connecting the carburetor respectively to the intake valves of several engine cylinders, said carburetor, valve means, and pipes together forming flow passages for the engine charge mixture which are devoid of liquid-retaining spaces and adapted to deliver unsuspended liquid equally to each of said intake valves.

4. A combustion engine having all its engine cylinders disposed in a straight row and having positively-operated intake valves, a carburetor having a distributing chamber closely associated therewith and separate passages connecting the same to each of said intake valves, said chamber and passages constituting flow passages for the engine charge mixture which are devoid of internal liquid-retaining pockets and shaped to deliver unsuspended liquid equally to each of said cylinders.

5. In an engine having all its engine cylinders in a row and positively-operated intake valves all on the same side of said row, a carburetor supplying the engine charge mixture and means for admitting water to said mixture, and separate passages connecting said supply of mixture and water to each of said intake valves, said carburetor and passages forming independent flow passages devoid of liquid-retaining cavities and adapted to deliver unsuspended liquid equally to each intake valve.

6. A combustion engine having all its engine cylinders disposed in a straight row and having positively-operated intake valves with their port entrances disposed on the same side of said row, a carburetor having a distributing chamber closely associated therewith and separate passages connecting the same to each of said intake valves, said chamber and passages constituting flow passages for the engine charge mixture which are devoid of internal liquid-retaining pockets and shaped to deliver unsuspended liquid equally to each of said cylinders.

7. In a multi-cylinder internal combustion engine, the combination with more than two cylinders disposed in a straight row and the valve means for the intake ports thereof, of a plurality of intake passages, a carburetor, and a mixture distributing chamber receiving fuel and air from the carburetor and distributing the same to the intake passages, the distributing chamber being arranged to distribute unsuspended liquid fuel therein to the intake passages equally.

8. In a multi-cylinder internal combustion engine, the combination with more than two cylinders disposed in a straight row and the valve means for the intake ports thereof, of a plurality of intake passages, a carburetor, and a mixture distributing chamber receiving fuel and air from the carburetor and distributing the same to the intake passages, the entrances to the intake passages being uniformly disposed with respect to both the carburetor and the distributing chamber, and the walls of the distributing chamber being shaped to drain into the intake passages, so that unsuspended liquid fuel is delivered to the intake passages equally.

9. In a multi-cylinder internal combustion engine, the combination with more than two cylinders disposed in a straight row and the valve means for the intake ports thereof, of a plurality of intake passages, a carburetor, and a rotary valve driven at a speed corresponding to that of the engine and receiving combustion air and liquid fuel from the carburetor and delivering the same to said intakes equally.

10. In a multi-cylinder internal combustion engine, the combination with more than two cylinders disposed in a straight row and the valve means for the intake ports thereof, of a plurality of intake passages, a carburetor, and a mixture distributing valve receiving fuel and air from the carburetor for distribution to the intake passages, said valve comprising a shell-like member driven at a speed corresponding to that of the engine and provided with an opening in a wall thereof to register seriatim with the entrances to said intake passages, whereby liquid fuel is delivered to the intake passages equally.

11. In a multi-cylinder internal combustion engine, the combination with more than two cylinders disposed in a straight row and the valve means for the intake ports thereof, of a plurality of intake passages, a carburetor, and a mixture distributing chamber receiving fuel and air from the carburetor and distributing the same to the intake passages, the distributing chamber floor being pitched downwardly to the intake passages whereby unsuspended liquid fuel in the distributing chamber is delivered to the intake passages equally.

12. In a multi-cylinder internal combustion engine, the combination with a plurality of cylinders disposed in a straight row and having L-shaped heads and having their valve means located in the extensions thereof, of a plurality of intake passages, a carburetor, and a mixture distributing chamber receiving air and fuel from the carburetor and distributing the same to the intakes, the distributing chamber being arranged to distribute unsuspended liquid fuel to the intakes equally.

13. The combination in a multi-cylinder internal combustion engine, of valve means for the intake ports thereof, a plurality of individual intake passages arranged to pass on toward the cylinders, substantially as fast as it appears, the fuel appearing in the intakes as unsuspended liquid, and spray carburetor means arranged to distribute fuel in liquid form and air to said intake passages equally, whereby fuel is supplied to the engine cylinders equally.

14. The combination in a multi-cylinder internal combustion engine, of valve means for the intake ports thereof, a spray carburetor means including a mixture distributing chamber, a plurality of individual intake passages branching from the distributing chamber and arranged to pass on to said intake ports, substantially as fast as it appears, the fuel appearing in the intakes as unsuspended liquid, and throttle means, located between the distributing chamber and the engine intake ports.

15. The combination in a multi-cylinder internal combustion engine, of valve means for the intake ports thereof, a plurality of intake passages arranged to pass on toward the cylinders, substantially as fast as it appears, the fuel appearing in the intakes as unsuspended liquid, spray carburetor means arranged to distribute fuel in liquid form and air to said intake passages equally, and throttle means symmetrically arranged and symmetrically operating between the carburetor nozzle and the entrances to the intake passages.

In testimony whereof, I have signed this specification in the presence of two witnesses.

JOHN GOOD.

Witnesses:
K. L. VRANT,
G. A. TAYLOR.